(12) United States Patent
Kim et al.

(10) Patent No.: US 10,313,515 B2
(45) Date of Patent: Jun. 4, 2019

(54) APPARATUS AND METHOD FOR PROVIDING PRESENCE SERVICE IN COMMUNICATION DEVICE

(75) Inventors: Si-Baek Kim, Suwon-si (KR); Eung-Moon Yeom, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 375 days.

(21) Appl. No.: 13/122,304

(22) PCT Filed: Oct. 1, 2009

(86) PCT No.: PCT/KR2009/005638
§ 371 (c)(1),
(2), (4) Date: Apr. 1, 2011

(87) PCT Pub. No.: WO2010/038996
PCT Pub. Date: Apr. 8, 2010

(65) Prior Publication Data
US 2011/0181411 A1 Jul. 28, 2011

(30) Foreign Application Priority Data
Oct. 2, 2008 (KR) ........................ 10-2008-0097214

(51) Int. Cl.
*H04M 1/82* (2006.01)
*H04M 3/42* (2006.01)
(Continued)

(52) U.S. Cl.
CPC .... *H04M 3/42374* (2013.01); *H04L 65/1073* (2013.01); *H04M 1/274516* (2013.01); *H04M 1/82* (2013.01); *H04M 2203/2044* (2013.01)

(58) Field of Classification Search
CPC . H04L 29/06027; H04L 67/10; H04L 12/581; H04W 8/18
(Continued)

(56) References Cited

U.S. PATENT DOCUMENTS 5,815,562 A * 9/1998 Iglehart ............ H04M 3/42229
370/264
6,076,093 A 6/2000 Pickering
(Continued)

FOREIGN PATENT DOCUMENTS

EP    1 503 604 A2    2/2005
KR    10-2005-0016989 A    2/2005
(Continued)

OTHER PUBLICATIONS

European Office Action dated Apr. 9, 2018, issued in European Application No. 09818006.0.
(Continued)

Primary Examiner — Hoi C Lau
(74) Attorney, Agent, or Firm — Jefferson IP Law, LLP

(57) ABSTRACT

An apparatus and a method for determining a state of a counterpart without executing a separate program executed in order to determine a current state of the counterpart in a communication apparatus are provided. The apparatus includes a state information server and a communication apparatus. When receiving state information, the state information server provides the received state information to a user who has registered the communication apparatus that has provided the state information. When receiving state information from the state information server, the communication apparatus outputs the user's state information corresponding to the state information.

16 Claims, 6 Drawing Sheets

(51) Int. Cl.
*H04M 1/2745* (2006.01)
*H04L 29/06* (2006.01)

(58) Field of Classification Search
USPC ......... 340/540; 345/156; 370/474, 352, 338;
455/556.1, 344
See application file for complete search history.

(56) References Cited

U.S. PATENT DOCUMENTS

| | | | | |
|---|---|---|---|---|
| 6,167,262 | A * | 12/2000 | Tanigawa | H04M 1/72513 379/156 |
| 8,106,887 | B2 * | 1/2012 | Park et al. | 345/169 |
| 2003/0154245 | A1 | 8/2003 | Rist et al. | |
| 2004/0001579 | A1 * | 1/2004 | Feinberg et al. | 379/156 |
| 2004/0204068 | A1 * | 10/2004 | Komaki | H04L 12/581 455/556.1 |
| 2005/0213609 | A1 * | 9/2005 | Brusilovsky | H04L 29/06027 370/474 |
| 2005/0250438 | A1 | 11/2005 | Makipaa et al. | |
| 2006/0111144 | A1 * | 5/2006 | Nakajima | H04L 63/04 455/556.1 |
| 2006/0148499 | A1 * | 7/2006 | Chie | 455/515 |
| 2006/0168015 | A1 * | 7/2006 | Fowler | 709/206 |
| 2006/0203968 | A1 | 9/2006 | Jorasch et al. | |
| 2006/0211454 | A1 * | 9/2006 | Park et al. | 455/566 |
| 2007/0022163 | A1 * | 1/2007 | Wormald et al. | 709/206 |
| 2007/0218997 | A1 * | 9/2007 | Cho | 463/42 |
| 2007/0282660 | A1 * | 12/2007 | Forth | 705/9 |
| 2008/0043986 | A1 * | 2/2008 | Darby | 379/265.09 |
| 2008/0045176 | A1 * | 2/2008 | Ho | H04L 12/581 455/344 |
| 2008/0056155 | A1 * | 3/2008 | Lahtiranta et al. | 370/254 |
| 2008/0106513 | A1 * | 5/2008 | Morotomi et al. | 345/156 |
| 2008/0120387 | A1 * | 5/2008 | Werndorfer et al. | 709/206 |
| 2008/0130639 | A1 * | 6/2008 | Costa-Requena et al. | 370/389 |
| 2008/0261569 | A1 * | 10/2008 | Britt et al. | 455/414.1 |
| 2008/0272936 | A1 * | 11/2008 | Kim | G08G 1/095 340/929 |
| 2008/0279161 | A1 * | 11/2008 | Stirbu et al. | 370/338 |
| 2009/0041052 | A1 * | 2/2009 | Balk et al. | 370/466 |
| 2009/0052365 | A1 * | 2/2009 | Foti | 370/314 |
| 2009/0059818 | A1 * | 3/2009 | Pickett | 370/259 |
| 2009/0163141 | A1 * | 6/2009 | Chae | H04M 1/6066 455/41.3 |
| 2009/0178062 | A1 * | 7/2009 | Westen | 719/328 |
| 2009/0185792 | A1 * | 7/2009 | Braunstein et al. | 386/117 |
| 2009/0258674 | A1 * | 10/2009 | Groth | 455/556.1 |
| 2009/0313336 | A1 * | 12/2009 | Haynes et al. | 709/206 |
| 2009/0319912 | A1 * | 12/2009 | Serr et al. | 715/753 |
| 2009/0327419 | A1 * | 12/2009 | Serr et al. | 709/204 |
| 2010/0257453 | A1 * | 10/2010 | Jachner | 715/738 |

FOREIGN PATENT DOCUMENTS

| | | |
|---|---|---|
| KR | 10-0595685 B1 | 7/2006 |
| KR | 10-0627831 B1 | 9/2006 |
| KR | 10-2008-0011514 A | 2/2008 |

OTHER PUBLICATIONS

European Office Action dated Dec. 20, 2018 issued in European Application No. 09818006.0.

* cited by examiner

APPARATUS AND METHOD FOR PROVIDING PRESENCE SERVICE IN COMMUNICATION DEVICE

BACKGROUND OF THE INVENTION

1. Field of the Invention

The present invention relates to an apparatus and a method for determining a state of a counterpart communication apparatus in a communication apparatus. More particularly, the present invention relates to an apparatus and a method for determining a state of a counterpart without executing a separate program executed in order to determine a current state of a counterpart in a communication apparatus.

2. Description of the Related Art

Recently, a study for integration of a communication technology is in active progress, and IP Multimedia Subsystem (IMS) is one of the communication technology integration. The IMS is a technology for providing multimedia such as voice, audio, video, high capacity data, and the like. in combination through an Internet Protocol (IP). Examples of a service based on the IMS include Presence, Push-To-Talk (PTT) on Cellular (PoC), Voice over IP (VoIP), a file share service, or other similar service.

Here, the presence service is a most representative service of the IMS based services and denotes a service constantly informing an access state of a specific communication apparatus.

Here, in the presence service, a server that provides the presence service receives access state information of respective terminals from the plurality of terminals, and a specific terminal requests the presence server to transmit access state information of the terminals in order to detect access state of the terminals.

A representative method for using the presence service is a messenger service, which is an application program executed on a Personal Computer (PC) or a Personal Digital Assistant (PDA).

However, to use the presence service, the communication apparatus (PC or PDA) should always operate and a user of the communication apparatus should access a relevant application program in person.

That is, for the communication apparatus to detect a counterpart user' state, the communication apparatus should detect the state of a counterpart communication apparatus by having to operate an apparatus that can communicate with the counterpart communication apparatus and access an application program of the operated apparatus.

In addition, since the presence service is provided via a Graphic User Interface (GUI), the communication apparatus should have a screen of a predetermined size to use the service. Accordingly, manufacturing costs of the communication apparatus may increase.

Therefore, to solve the above problems, an apparatus and a method for detecting a counterpart's state without accessing a separate application program are required.

In addition, recently, a telephone mounting a large sized Liquid Crystal Display (LCD) may provide the service. However, in this case, since counterpart user's information viewed on one screen is limited, a user should use an exploring function or a scroll to view presence information of desired counterpart user. Therefore, when the number of registered counterpart users is large, it takes much time to explore the desired counterpart user.

SUMMARY OF THE INVENTION

An aspect of the present invention is to address at least the above-mentioned problems and/or disadvantages and to provide at least the advantages described below. Accordingly, an aspect of the present invention is to provide an apparatus and a method for detecting a counterpart user's state without using a separate program in a communication apparatus.

Another aspect of the present invention is to provide an apparatus and a method for requesting the state of a counterpart communication apparatus using Direct Station Selection (DSS), Add on Module (AOM) in a communication apparatus.

Still another aspect of the present invention is to provide an apparatus and a method for providing a counterpart user's state information without a separate output screen in a communication apparatus.

In accordance with an aspect of the present invention, an apparatus for providing state information in a mobile communication system is provided. The apparatus includes a state information server for, when receiving state information, providing the received state information to a user who has registered a communication apparatus that has provided the state information, and a communication apparatus for, when receiving state information from the state information server, outputting the user's state information corresponding to the state information.

In accordance with another aspect of the present invention, a method for providing state information in a mobile communication system is provided. The method includes, when receiving state information, providing the received state information to a user who has registered a communication apparatus that has provided the state information, and when receiving state information from a state information server, outputting the user's state information corresponding to the state information.

As described above, to solve the problem of having to operate an apparatus that can communicate with a counterpart communication apparatus and access an application program of the operated communication apparatus in order to detect the state of the counterpart communication apparatus, the present invention may detect the state of the counterpart user without a separate program in a communication apparatus, thereby solving the above problem. In addition, the present invention solves a problem of having to include a screen of a predetermined size for a Graphic User Interface (GUI) when using the conventional presence service, thereby reducing manufacturing costs of a communication apparatus.

Other aspects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings in which.

Throughout the drawings, like reference numerals will be understood to refer to like parts, components and structures.

DETAILED DESCRIPTION OF EXEMPLARY EMBODIMENTS

Figure 1:
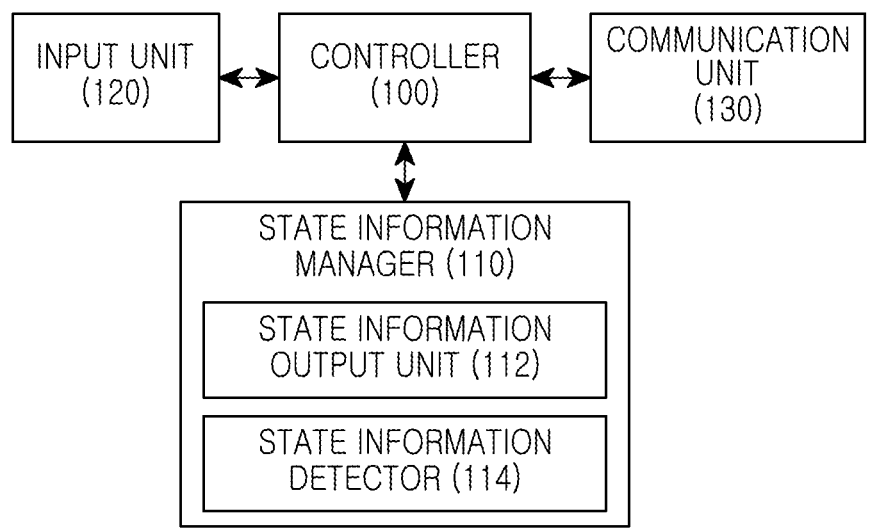
FIG. 1 is a block diagram illustrating a communication apparatus according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention provide an apparatus and a method for detecting the state of a counterpart user without using a separate program in a communication apparatus to solve a problem of having to operate an apparatus that can communicate with a counterpart communication apparatus and access an application program of the operated communication apparatus in order to detect the counterpart user of the counterpart communication apparatus.

In addition, the communication apparatus includes a mobile communication terminal such as a cellular phone, a Personal Communication System (PCS), a Personal Digital Assistant (PDA), and an International Mobile Telecommunication-2000 (IMT-2000) terminal, a wired terminal such as a key phone, a PC that can transmit data, etc. The following description is made using the general construction of the above examples.

FIGS. 1 through 6, discussed below, and the various exemplary embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly state otherwise. A set is defined as a non-empty set including at least one element.

FIG. 1 is a block diagram illustrating a communication apparatus according to an exemplary embodiment of the present invention.

Referring to FIG. 1, the communication apparatus includes a controller 100, a state information manager 110, an input unit 120, and a communication unit 130. The state information manager 110 may include a state information output unit 112 and a state information detector 114. However, the communication apparatus may include additional units that are not illustrated here merely for sake of clarity. Similarly, the functionality of two or more of the above noted units may be integrated into a single component.

The controller 100 of the communication apparatus controls the general functions of the communication apparatus. For example, the controller 100 performs processes and controls for voice communication. According to an exemplary embodiment of the present invention, the controller 100 performs a process of registering a user to detect state information.

In addition, when receiving state information from a state information server, the controller 100 outputs state information of a user corresponding to the state information to the state information output unit 112.

The controller 100 of the communication apparatus determines the state information of the communication apparatus to inform the state information server of the state of the communication apparatus.

That is, the controller 100 of the communication apparatus registers a user whose state information is to be detected, informs state information received from the server using a Light Emitting Diode (LED), a beep note, etc. to output a current state of the registered user, and determines a user's state of the communication apparatus in case of providing state information to the state information server.

As described above, the state information manager 110 includes the state information output unit 112 and the state information detector 114. The state information output unit 112 outputs a state of a user registered in advance, and may be a speaker, LEDs emitting a plurality of colors. The state information detector 114 detects the state of the communication apparatus to be provided to the state information server.

First, when receiving state information from the state information server, the state information manager 110 outputs the provided state information to the state information output unit 112. At this point, the state information manager 110 outputs the state information by representing whether a counterpart user stands by or is absent using a sound such as beep note, or displaying a turned-off state of the LED when a user of the counterpart communication apparatus is in an on-line state (stand-by state), displaying a red LED when the user of the counterpart communication apparatus is absent, displaying a green LED when the user of the counterpart communication apparatus is doing a different business, and displaying a blinking LED when the user of the counterpart communication apparatus is in communication.

In addition, in case of providing state information to the state information server, the state information manager 110 allows the state information detector 114 to determine the state of a user.

The input unit 130 includes a plurality of function keys such as numerical key buttons of 0 to 9, a menu button, a cancel button (delete), an OK button, a TALK button, an END button, an Internet access button, navigation key buttons (or directional keys), letter input keys, and other similar input keys and buttons. The input unit 130 provides key input data corresponding to a key pressed by a user to the controller 100. Accordingly, the communication apparatus may detect user information to be registered using information input via the input unit 130.

The communication unit 130 performs a function for transmitting/receiving data to/from the counterpart communication apparatus. According to an exemplary embodiment of the present invention, the communication unit 130 transmits information of a user to be registered and state information informing the state of the communication apparatus to the state information server. In addition, the communication unit 130 receives state information informing the state of the counterpart communication apparatus from the state information server and provides the same to the controller 100.

The function of the state information manager 110 may be performed by the controller 100 of the communication apparatus. The separate configuration and illustration of the state information manager 110 are an exemplary purpose only for inconvenience in description, not for limiting the scope of the present invention. It would be obvious to those skilled in the art that various modifications may be made within the scope of the present invention. For example, all functions of the state information manager 110 may be processed by the controller 100.

In addition, the state information server connected to the communication apparatus registers and manages counterpart communication apparatuses corresponding to the communication apparatus using user information received from the communication apparatus, and when receiving state information of the counterpart communication apparatus, transmits the state information to communication apparatus that have registered the counterpart communication apparatuses and transmitted the state information to provide the state of the communication apparatus corresponding to the state information.

Up to now, description has been made to an apparatus for detecting a state of a counterpart without using a separate program in a communication apparatus to solve the conventional problem of having to operate an apparatus that can communicate with a counterpart communication apparatus and access an application program of the operated communication apparatus in order to detect the counterpart of the counterpart communication apparatus. Hereinafter, a method for detecting a state of a counterpart without using a separate program using the above apparatus according to an exemplary embodiment of the present invention is described.

Figure 2:
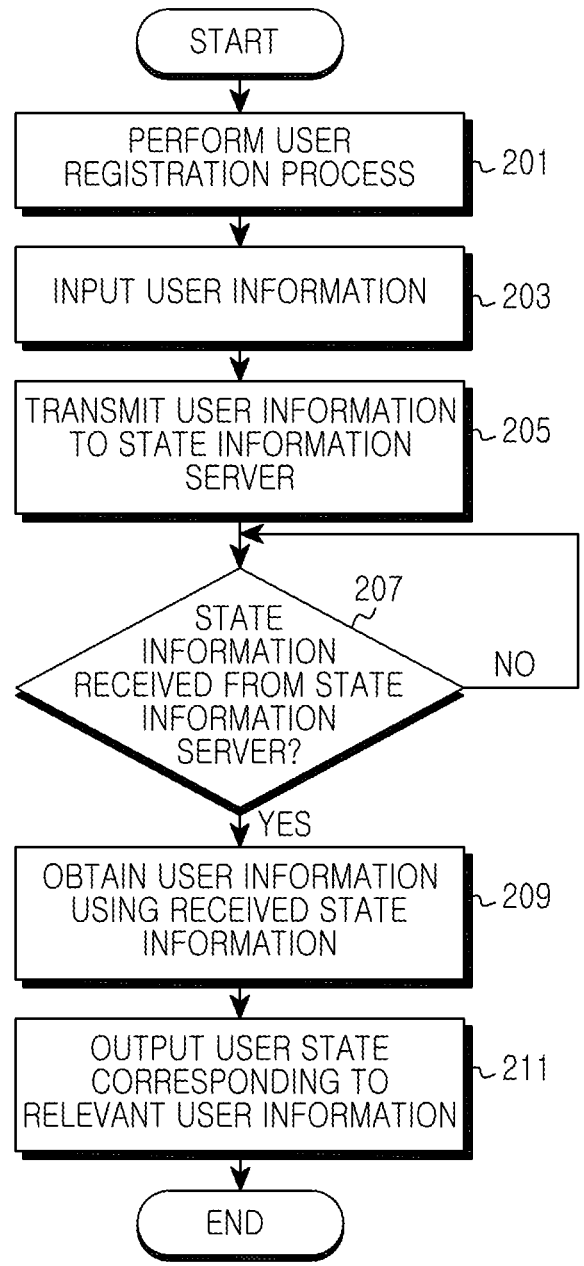
FIG. 2 is a flowchart illustrating a process for detecting state information in a communication apparatus according to an exemplary embodiment of the present invention.

FIG. 2 is a flowchart illustrating a process for detecting state information in a communication apparatus according to an exemplary embodiment of the present invention.

Referring to FIG. 2, the communication apparatus performs a user registration process in step 201. Here, the user registration process denotes a process for setting and registering counterpart users (users whose current states are to be detected) to be detected in the communication apparatus.

The communication apparatus for performing the user registration process receives user information in step 203, and transmits the received user information to a state information server in step 205. In other words, the communication apparatus can perform the user registration process by receiving a number of a counterpart communication apparatus from a user of the communication apparatus and transmitting the same to the state information server.

The communication apparatus determines whether state information is received from the state information server in step 207. Here, the state information denotes information representing whether a counterpart user registered during the user registration process is in communication, is absent, or is in an on-line.

If it is determined in step 207 that the state information is not received, the communication apparatus re-performs the process of step 207.

In contrast, if it is determined in step 207 that the state information is received in step 207, the communication apparatus proceeds to step 209 to detect the received state information and obtain user information. That is, the communication apparatus determines state information of a user corresponding to the received state information.

After that, the communication apparatus outputs the state of the user corresponding to the obtained user information to the state information output unit 112.

Here, the state information output unit 112 outputs the state of a user registered in advance, and may be a speaker and LEDs emitting a plurality of colors. That is, the state information output unit 112 may represent the state of a counterpart user by representing whether a counterpart user stands by or is absent using a sound such as beep note, or outputting light emission information (light emission color) of an LED defined in advance depending on a state of a counterpart user.

After that, the communication apparatus ends the present algorithm.

Figure 3:
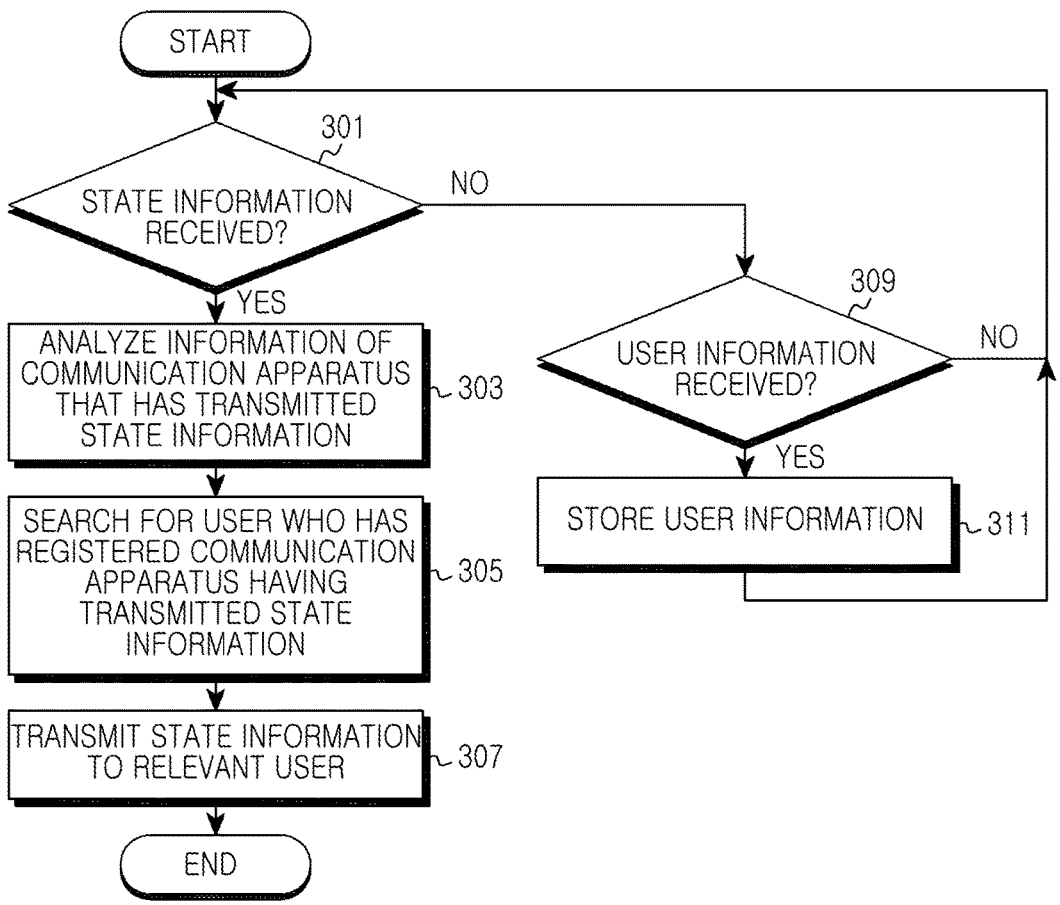
FIG. 3 is a flowchart illustrating a process for operating a state information server according to an exemplary embodiment of the present invention.

FIG. 3 is a flowchart illustrating a process for operating a state information server according to an exemplary embodiment of the present invention.

Referring to FIG. 3, the state information server determines whether state information or user information is received from one communication apparatus, or a plurality of communication apparatuses in step 301.

When receiving state information representing user state of a communication apparatus in step 301, the state information server proceeds to step 303 to analyze information of the communication apparatus that has transmitted the received state information. In other words, step 303 is a process for determining the information of the communication apparatus that has transmitted the received state information.

The state information server searches for a user who has registered the communication apparatus that has transmitted the state information in step 305. Here, the state information server determines user information stored in advance to determine a communication apparatus that has registered a user of a relevant communication apparatus, in other words, the communication apparatus that has transmitted the state information.

The communication apparatus transmits relevant state information to the determined communication apparatuses in step 307.

In contrast, when the state information representing user state of the communication apparatus is not received in step 301, the state information server proceeds to step 309 to determine whether user information required for registration of user information is received.

When the user information is not received in step 309, the state information server repeatedly performs the process of step 301.

In contrast, when the user information is received in step 309, the state information server proceeds to step 311 to store user information. That is, the state information server performs a user information registration process for registering a counterpart communication apparatus to be detected in the communication apparatus for each communication apparatus that has transmitted user information.

After that, the state information server re-performs the process of step 301.

Figure 4:
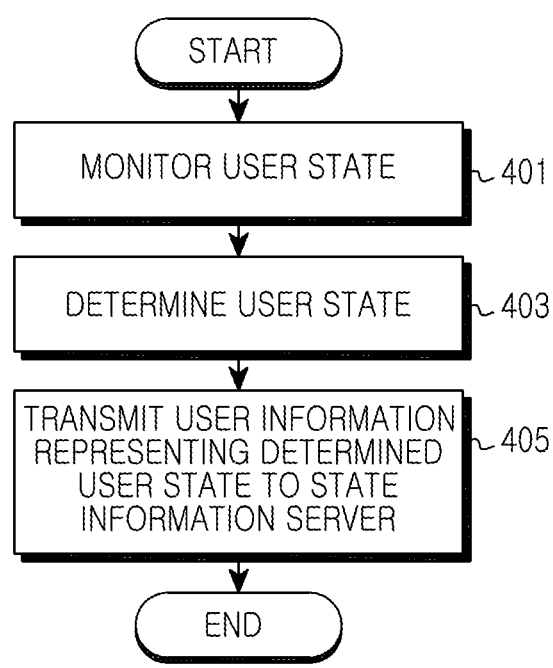
FIG. 4 is a flowchart illustrating a process for transmitting state information in a communication apparatus according to an exemplary embodiment of the present invention.

FIG. 4 is a flowchart illustrating a process for transmitting state information in a communication apparatus according to an exemplary embodiment of the present invention.

Referring to FIG. 4, the communication apparatus monitors a user state in step 401. Here, the user state represents a current state of a user who uses the communication apparatus and represents whether a user is absent, or is in communication, or is in an on-line state.

At this point, the communication apparatus may determine the state of the communication apparatus by determining state information set by a user of the communication apparatus in person.

The communication apparatus determines a state of a user of the communication apparatus according to the monitoring process in step 403, and proceeds to step 405 to transmit user information, which is information representing the user state determined in step 403, to a state information server.

After that, the communication apparatus ends the present algorithm.

Figure 5:
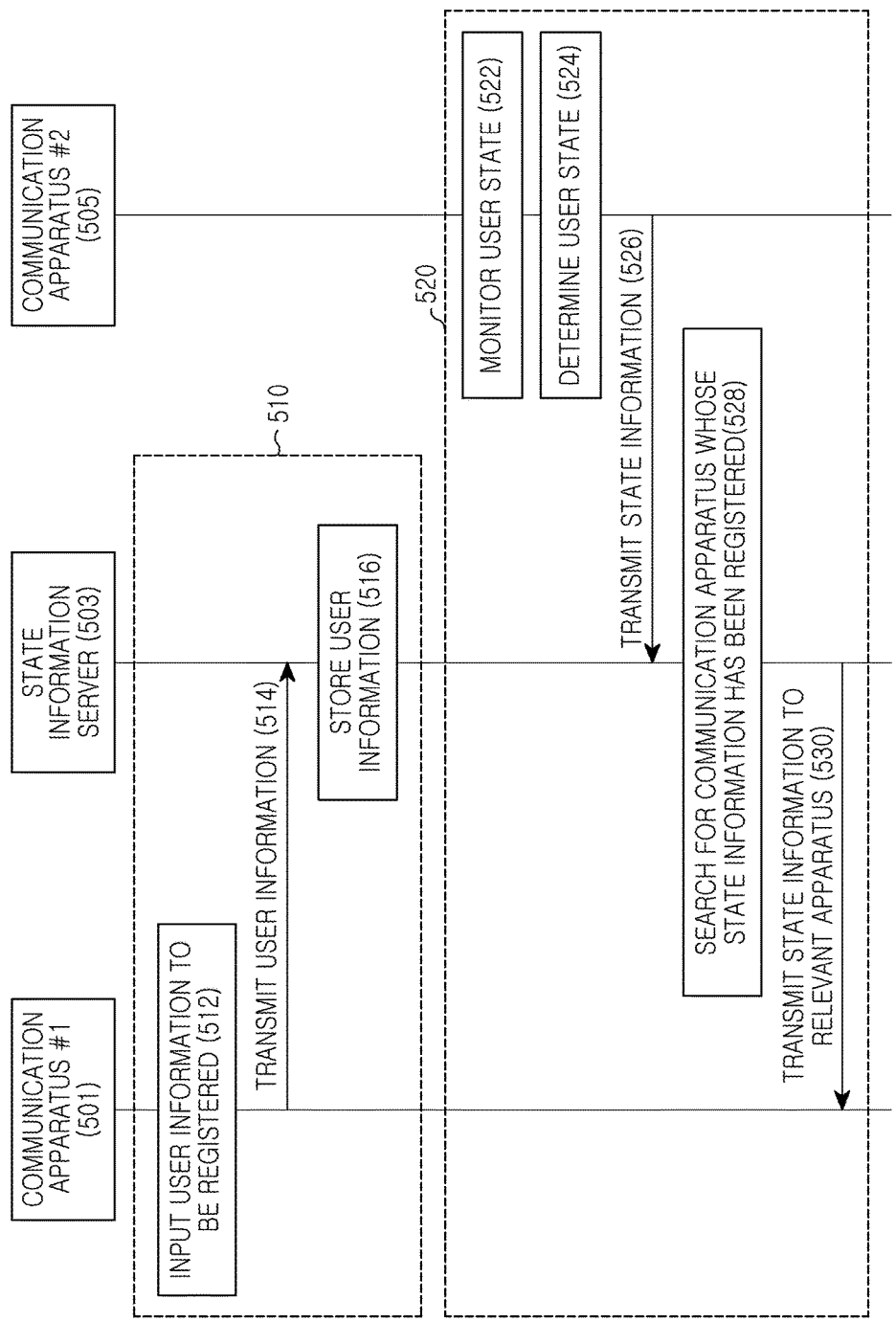
FIG. 5 is a view illustrating a process for operating a system for providing state information according to an exemplary embodiment of the present invention.

FIG. 5 is a view illustrating a process for operating a system for providing state information according to an exemplary embodiment of the present invention.

Referring to FIG. 5, the system may include a communication apparatus 501 (communication apparatus #1) for determining state information, a state information server 503 for providing the state information, and a counterpart communication apparatus 505 (communication apparatus #2) to be detected by the communication apparatus 501.

First, the communication apparatus 501 for determining the state information performs a user registration process 510 for registering the counterpart communication apparatus 505 to be detected.

During the user registration process 510, the communication apparatus receives (512) user information to be registered, and then transmits (514) the received user information to the state information server 503.

Accordingly, the state information server 503 completes the user registration process by storing (516) the received user information. Here, the user registration process 510 denotes a process for registering the counterpart communication apparatus 505 to be detected by the communication apparatus 501.

When the user registration process 510 is completed, the counterpart communication apparatus 505 performs a process 520 for providing state information.

The process 520 for providing the state information is as follows.

The counterpart communication apparatus 505 determines (524) a state of a user by periodically monitoring (522) the user state in order to perform the process for providing the state information.

Here, the user state includes information representing that a user of the communication apparatus 505, that is, the counterpart communication apparatus 505 is in communication, information representing that the user is absent, information representing that the user is doing a different business, and the information (on-line state) representing that the user stands by.

The counterpart communication apparatus 505 that has determined the user state transmits (526) the determined user state to the state information server 503, and the state information server 503 that has received the user state information searches for (528) a communication apparatus 501 that has transmitted the state information, that is, the communication apparatus that has registered the counterpart communication apparatus. After that, the state information server 503 transmits the state information to searched communication apparatuses 501 to end the process 520 for providing the state information.

Figure 6:
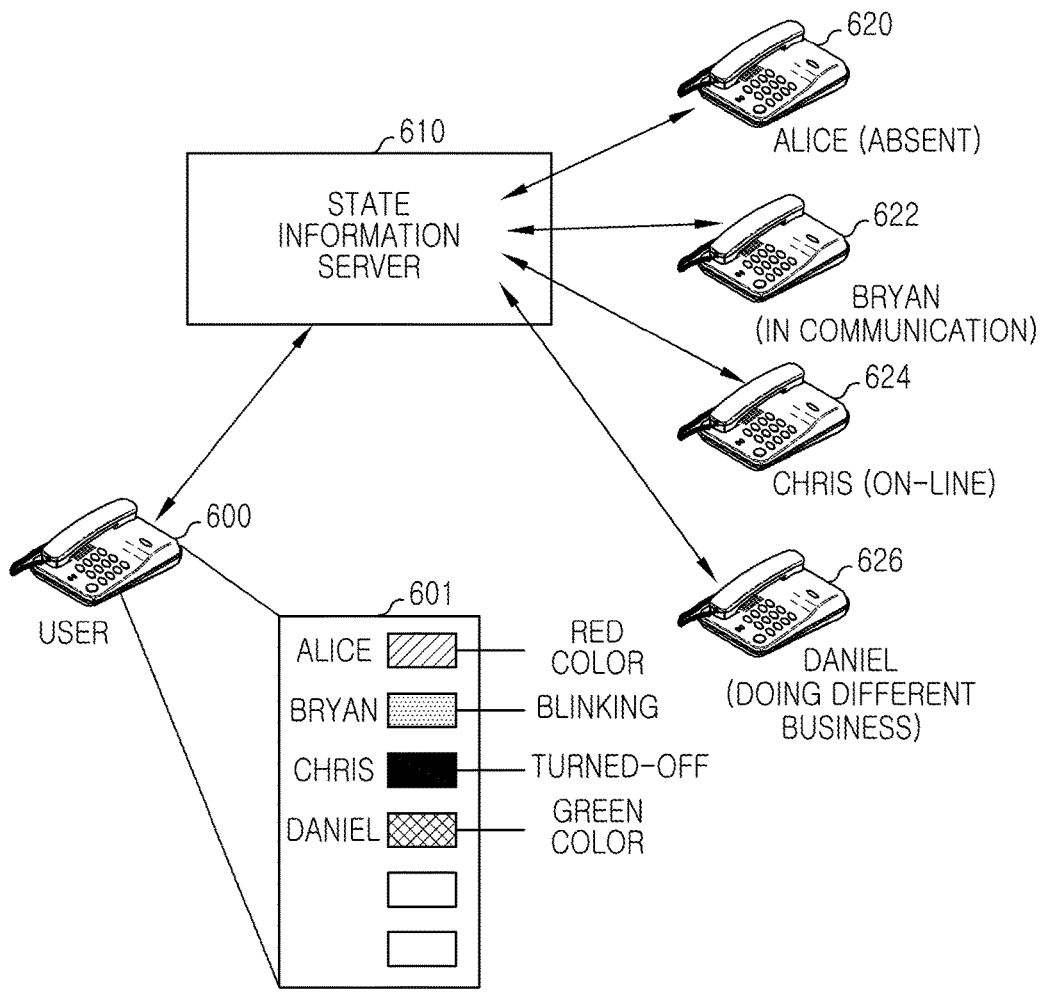
FIG. 6 is a view illustrating a process for operating a communication apparatus for providing state information according to an exemplary embodiment of the present invention.

FIG. 6 is a view illustrating a process for operating a communication apparatus for providing state information according to an exemplary embodiment of the present invention.

As illustrated in FIG. 6, the communication apparatus 600 registers counterpart communication apparatuses in a state information server 610 in order to register the counterpart communication apparatuses 620, 622, 624, and 626 whose state information is to be detected.

In addition, the counterpart communication apparatuses 620, 622, 624, and 626 periodically determine a user state, and when the user state changes, transmits the changed user state to the state information server 610. The state information server 610 provides the state information to the communication apparatus 600.

Accordingly, the communication apparatus 600 outputs state information of the counterpart communication apparatus using LED emission information defined in advance for each counterpart communication apparatus to a state information output unit.

Assuming that Alice is absent, Bryan is in communication, Chris is in an on-line state, that is, stands by, and Daniel is doing a different business among the counterpart communication apparatuses, the communication apparatus receives state information from the state information server 610 to output state information by displaying a turned-off state of an LED when a counterpart user is in an on-line state (stands by), red color of an LED when the counterpart user is absent, green color of an LED when the counterpart user is doing a different business, and a blinking state of an LED when the counterpart user is in communication as illustrated in 610.

The above method for providing state information provides the state information when the state information changes in the counterpart communication apparatus, but according to an exemplary embodiment of the present invention, when the communication apparatus requests state information, the communication apparatus may receive the user state information from the counterpart communication apparatus.

Referring to FIG. 6, when a state changes in a direction opposite to the above description, the communication apparatus 600 transmits state information of the communication apparatus to the state information server 610, and the state information server 610 transmits the state information of the communication apparatus 600 to the counterpart terminals 620, 622, 624, and 626 that have registered the communication apparatus 600.

Although the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A first apparatus for providing presence service, the first apparatus comprising:
a plurality of output elements;
at least one transceiver configured to:
transmit user information for a second apparatus to a server for registering the second apparatus,
transmit, to the server, a signal for requesting a current state of a user, and
receive, from the server, state information indicating the current state of the user of the registered second apparatus, wherein the state information is transmitted in response to searching the first apparatus which registers the second apparatus according to the signal by the server; and
at least one processor configured to:
identify an output element corresponding to the registered second apparatus among the plurality of output elements on the first apparatus based on the state information, and
provide the current state of the user by using the output element without displaying the current state on a screen for a graphic user interface (GUI),
wherein the plurality of output elements on the first apparatus correspond to a plurality of registered apparatuses, respectively.

2. The first apparatus of claim 1,
wherein the output element is a light emitting diode (LED) on the first apparatus,
wherein the plurality of output elements is a plurality of LEDs on the first apparatus, and
wherein the at least one processor is, in order to provide the current state, further configured to:
emit a first color by using the output element on the first apparatus if the current state is a first state of the user, and
emit a second color by using the output element on the first apparatus if the current state is a second state of the user.

3. The first apparatus of claim 1, wherein the at least one processor, in order to identify the output element, is further configured to:
obtain identification information indicating the user of the second apparatus from the state information; and
identify the output element among the plurality of output elements according to the obtained identification information,
wherein each of the plurality of output elements provides a current state of a user of a registered apparatus corresponding to each of the plurality of output elements.

4. The first apparatus of claim 1, wherein the state information is transmitted in response to detecting that a state of the user of the registered second apparatus is changed to the current state according to a input of the user of the second apparatus.

5. A second apparatus for providing presence service, the second apparatus comprising:

at least one processor configured to determine state information indicating a current state of a user of the second apparatus according to an input of the user of the second apparatus, and
at least one transceiver configured to transmit the determined state information to a server,
wherein the determined state information is provided from the server to a first apparatus which has registered the second apparatus at the server in response to searching the first apparatus according to a signal for requesting the current state of the user by the server,
wherein the first apparatus transmits user information for the second apparatus to the server to register the second apparatus and transmits the signal to the server,
wherein the current state of the user is provided by using an output element without displaying the current state on a screen for a graphic user interface (GUI),
wherein the output element corresponding to the registered second apparatus is identified based on the state information among a plurality of output elements on the first apparatus, and
wherein the plurality of output elements on the first apparatus correspond to a plurality of registered apparatuses, respectively.

6. The second apparatus of claim 5, wherein the at least one processor is, in order to transmit the state information, further configured to transmit the state information in response to detecting a state of the user of the second apparatus is changed to the current state according to the input.

7. A server for providing presence service, the server comprising:
at least one transceiver; and
at least one processor operatively coupled to the at least one transceiver,
wherein the at least one processor is configured to:
receive user information for a second apparatus from a first apparatus,
store the user information for the second apparatus to register the second apparatus,
receive state information indicating a current state of a user of the second apparatus from the second apparatus,
store the received state information of the second apparatus,
receive, from the first apparatus, a signal for requesting the current state of the user,
search an apparatus which has transmitted the user information for the second apparatus to the server to register the second apparatus, according to the signal, and
in response to the first apparatus being searched, transmit the stored state information of the second apparatus to the searched first apparatus,
wherein the current state of the user is provided by using an output element without displaying the current state on a screen for a graphic user interface (GUI),
wherein the output element corresponding to the registered second apparatus is identified based on the state information among a plurality of output elements on the first apparatus, and
wherein the plurality of output elements on the first apparatus correspond to a plurality of apparatuses registered at the server, respectively.

8. The server of claim 7,
wherein the first apparatus is searched to transmit the state information, in response to detecting that a state of the user of the second apparatus is changed to the current state according to a input of the user of the second apparatus, wherein the state information comprises identification information indicating the user of the second apparatus to identify the user among users of the plurality of registered apparatuses, and wherein the current state comprises a communication state, an absent state, or an on-line state.

9. A method for operating a first apparatus to provide presence service, the method comprising:

transmitting user information for a second apparatus to a server for registering the second apparatus;

transmitting a signal for requesting a current state of a user to the server;

receiving, from the server, state information indicating the current state of the user of the registered second apparatus, wherein the state information is transmitted in response to searching the first apparatus which register the second apparatus according to the signal by the server;

identifying an output element corresponding to the registered second apparatus among a plurality of output elements on the first apparatus based on the state information; and providing the current state of the user by using the output element without displaying the current state on a screen for a graphic user interface (GUI), wherein the plurality of output elements on the first apparatus correspond to a plurality of registered apparatuses, respectively.

10. The method of claim 9, wherein the output element is a light emitting diode (LED) on the first apparatus, wherein the plurality of output elements is a plurality of LEDs on the first apparatus, and wherein the providing of the current state comprises:

emitting a first color by using the output element on the first apparatus if the current state is a first state of the user; and emitting a second color by using the output element on the first apparatus if the current state is a second state of the user.

11. The method of claim 9, wherein the providing of the current state comprises:

obtaining identification information indicating the user of the second apparatus from the state information; and identifying the output element among the plurality of output elements according to the obtained identification information, wherein each of the plurality of output elements provides a current state of a user of a registered apparatus corresponding to each of the plurality of output elements.

12. The method of claim 9, wherein the state information is transmitted in response to detecting that a state of the user of the registered second apparatus is changed to the current state according to a input of the user of the second apparatus.

13. A method for operating a second apparatus to provide presence service, the method comprising:

determining state information indicating a current state of a user of the second apparatus according to an input of the user of the second apparatus; and transmitting the determined user state information to a server, wherein the determined state information is provided from the server to a first apparatus which has registered the second apparatus at the server in response to searching the first apparatus according to a signal for requesting the current state of the user by the server, wherein the first apparatus transmits user information for the second apparatus to the server to register the second apparatus and transmits the signal to the server, wherein the current state of the user is provided by using an output element among a plurality of output elements on the first apparatus without displaying the current state on a screen for a graphic user interface (GUI), wherein the output element corresponding to the registered second apparatus is identified based on the state information among a plurality of output elements on the first apparatus, and wherein the plurality of output elements on the first apparatus correspond to a plurality of registered apparatuses, respectively.

14. The method of claim 13, wherein the transmitting of the state information comprises:

transmitting the state information in response to detecting a state of the user of the second apparatus is changed to the current state according to the input.

15. A method for operating a server to provide presence service, the method comprising:

receiving, from a first apparatus, user information for a second apparatus;

storing the user information for the second apparatus to register the second apparatus;

receiving, from the second apparatus, state information indicating a current state of a user of the second apparatus;

storing the received state information of the second apparatus;

receiving, from the first apparatus, a signal for requesting the current state of the user;

search an apparatus which has transmitted the user information for the second apparatus to the server to register the second apparatus, according to the signal; and in response to the first apparatus being searched, transmitting the stored state information of the second apparatus to the searched first apparatus, wherein the current state of the user is provided by using an output element without displaying the current state on a screen for a graphic user interface (GUI), wherein the output element corresponding to the registered second apparatus is identified based on the state information among a plurality of output elements on the first apparatus, and wherein the plurality of output elements on the first apparatus correspond to a plurality of apparatuses registered at the server, respectively.

16. The method of claim 15, wherein the first apparatus is searched to transmit the state information, in response to detecting that a state of the user of the second apparatus is changed to the current state according to an input of the user of the second apparatus, wherein the state information comprises identification information indicating the user of the second apparatus to identify the user among users of the plurality of registered apparatuses, and wherein the current state comprises a communication state, an absent state, or an on-line state.

* * * * *